May 7, 1957 R. C. STOLTE 2,791,287
HYDRAULIC POWER STEERING MECHANISM
Filed July 19, 1954 2 Sheets-Sheet 1

Inventor
Richard C. Stolte
By C. F. Dible
Attorney

May 7, 1957 R. C. STOLTE 2,791,287
HYDRAULIC POWER STEERING MECHANISM
Filed July 19, 1954 2 Sheets-Sheet 2

INVENTOR
Richard C. Stolte
BY
ATTORNEY

United States Patent Office 2,791,287
Patented May 7, 1957

2,791,287

HYDRAULIC POWER STEERING MECHANISM

Richard C. Stolte, Birmingham, Mich., assignor to General Motors Corporation, Detroit, Mich., a corporation of Delaware Application July 19, 1954, Serial No. 444,277

2 Claims. (Cl. 180—79.2)

This invention relates to fluid power steering and more particularly concerns a method whereby the power steering effort is progressively reduced as car speed increases. The invention includes a system of apparatus for practicing the method.

Many operators of automotive vehicles, while recognizing the advantage of power steering equipment during parking and maneuvering in close quarters, object to any power assist when the car is traveling at highway speeds and the steering resistance is relatively light. Although a number of schemes have been heretofore proposed whereby the power assist is cut out at a predetermined vehicle speed; such schemes are generally considered objectionable because of the abruptness of the transition, which under certain circumstances could be dangerous. Moreover, it is felt that there is really no clear line of demarcation in terms of vehicle speed between the need for power steering and the lack of a need for it; and for this reason, also, it is the general opinion that the withdrawal of the assist should be gradual.

The present invention has particular relation to power steering apparatus of the type involving a constantly operating pump, generally powered from the engine of the vehicle, as through a take-off from the crank or generator shaft, a reservoir from which the pump draws, a fluid motor operatively associated with a steering member, and an "open-center" control valve through which the motor is energized to move in one direction or the other as determined by the direction of rotation of the steering wheel. By an "open-center" control valve is meant a valve which in its neutral position (corresponding to the straight-ahead position of the dirigible wheels) allows for the circulation of the fluid medium through the system against the static pressure of the fluid in the motor.

Figure 1:
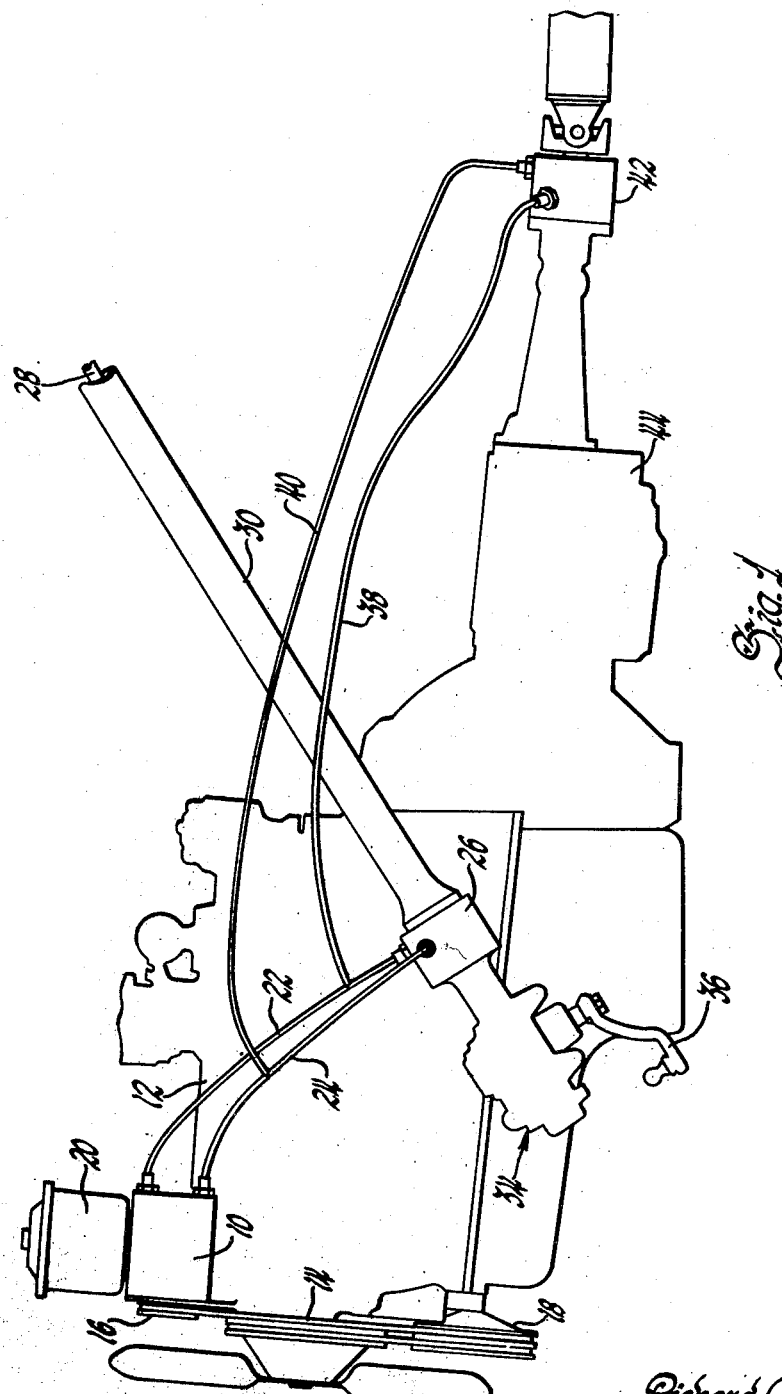

In accordance with the method herein, the desired progressive reduction in the power assist is obtained by gradually depriving the pressure line to the motor of fluid as vehicle speed increases. I have found that this may be most expeditiously accomplished by placing a second or "robber" pump in series relation with the power steering pump in the manner, for example, of the accompanying drawings wherein:

Fig. 1 shows an installation conforming to the invention; and

Figure 2:
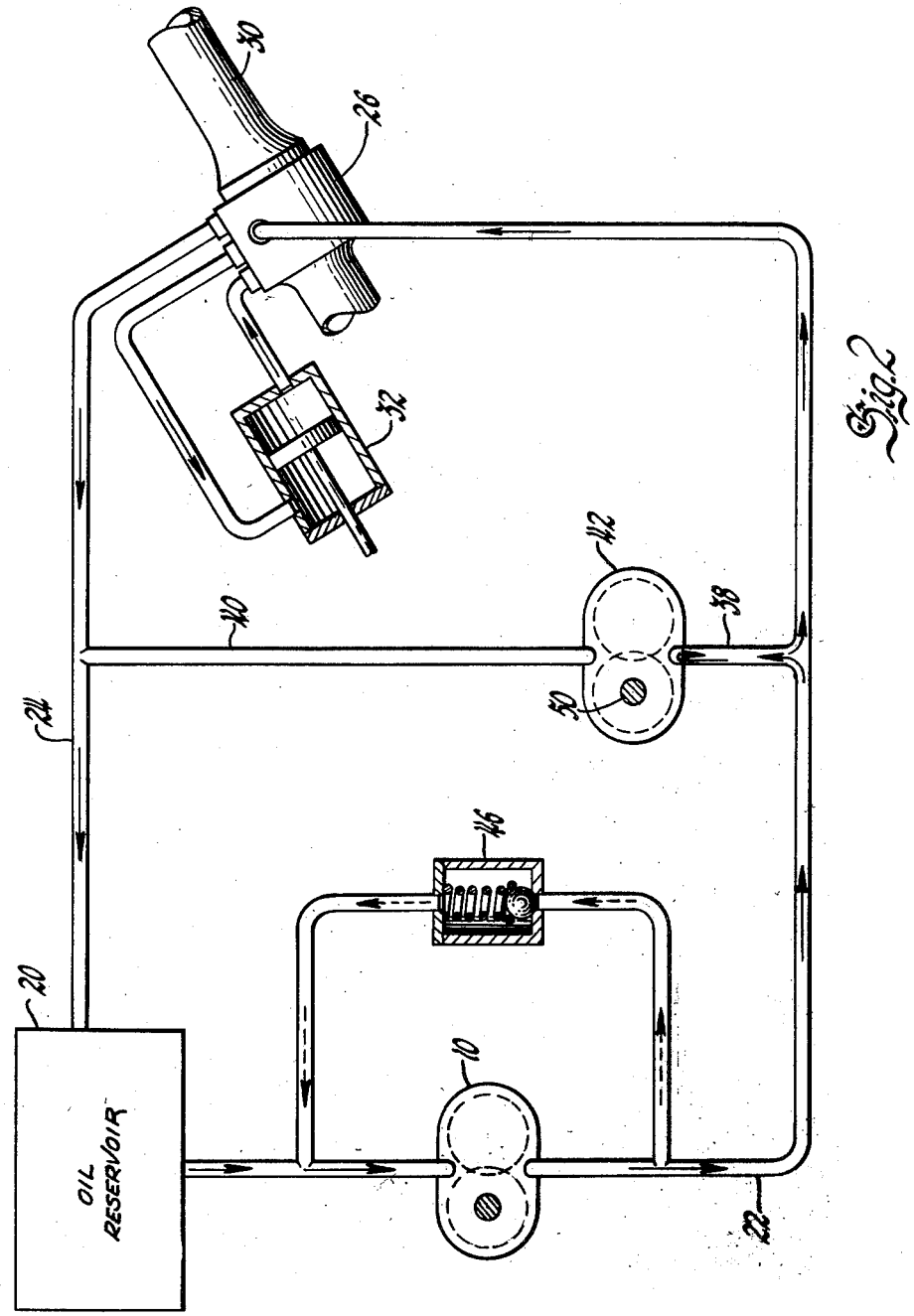

Fig. 2 diagrammatically illustrates the principle thereof.

Referring first to Fig. 1 the numeral 10 denotes a power steering pump of any suitable design, the same being mounted on the engine block 12 and being powered from the crankshaft of the engine via a belt 14 passing around pulleys 16 and 18. Positioned on top of and serving the pump 10 is a reservoir 20 filled to a predetermined level with hydraulic fluid, normally a mineral oil of suitable viscosity characteristics.

Pump 10 is connected via a pressure line 22 and a return line 24 to a control valve 26, which will be assumed as conforming to the valve disclosed in Davis Patent 2,213,271. Thus, the valve which functions to control the flow of fluid between the pump 10 and a fluid motor 32 (Fig. 2) housed within the gear box 34, is actuated, as fully explained in the identified patent, by reactionary axial movement of the steering shaft 28, encased within the usual mast jacket or column 30. Pitman arm or rock arm 36, representing the output of the gear box, is adapted to actuate substantially any type of steering linkage.

Extending from lines 22 and 24 mediate the pump 10 and the valve 26 will be observed two conduits 38 and 40, respectively, leading to a second pump 42, which in basic design may or may not conform with the pump 10. Pump 42 is positioned rearward of the engine transmission 44, being powered by the transmission output shaft 50 (Fig. 2). Accordingly, this pump rotates at a speed directly proportional to vehicle speed.

From Fig. 2, wherein the numeral 46 denotes a spring-loaded ball relief valve designed to open at a predetermined pressure gauged to prevent damage to the disclosed system, it will be readily seen that the quantity of oil withdrawn from the pressure line 22 by the pump 42 is a function of the rate of rotation of the pump, which, as just indicated, depends on the vehicle speed. Assuming the operator of the vehicle is engaged in parking the same in a narrow space, a condition of highest power steering demand, pump 42 will deprive line 22 of very little fluid, if any, so that the pressure potentially available for energization of the motor 32 is maximum. On the other hand, if the vehicle is traveling at a cruising speed, of say 50 miles per hour, a condition where power steering equipment is superfluous, virtually all of the pressure fluid is returned to the reservoir 20 by the pump 42, with the result that the steering is carried out manually without a power assist. It is to be emphasized that at no time within the vehicle speed range indicated is there an abrupt drop or increase in the quantity of fluid passing beyond the branch line 38. Rather, the change follows a smooth curve and is unsensed at the steering wheel.

Having thus described and illustrated my invention what I claim is:

1. In a self-propelled vehicle, fluid power steering apparatus comprising a fluid motor operably connected to a steering member, a pump for developing the pressure required in the operation of said motor, a control valve in fluid circuit between said pump and said motor, said valve having a return line to said pump, and a second pump connected across the discharge line of said first pump and said return line, said second pump being operated at a speed bearing a fixed relation to vehicle speed whereby said motor is progressively deprived of pressure fluid as vehicle speed increases.

2. Apparatus according to claim 1 where the vehicle is provided with a transmission and said second pump is operated by the transmission output shaft.

References Cited in the file of this patent

UNITED STATES PATENTS

| 2,213,271 | Davis | Sept. 3, 1940 |
| 2,234,775 | Parsons | Mar. 11, 1941 |
| 2,603,065 | Sarto | July 15, 1952 |